Patented May 13, 1952

2,596,753

UNITED STATES PATENT OFFICE 2,596,753

METHOD OF PROCESSING AND CANNING WHOLE SWEET MILK

Lloyd T. Winger, Trinidad, Colo.

No Drawing. Application September 14, 1951, Serial No. 246,531

9 Claims. (Cl. 99—151)

1

This invention relates to processing and canning whole sweet milk and in particular a new and improved method of treating whole sweet milk to produce a sterilized and stabilized product that will keep in different climates at room temperature without refrigeration and that will keep for indefinite periods of time.

The purpose of this invention is to provide means for dissipating hydrogen peroxide used universally in milk pasteurization processes and which leaves a condensed milk taste, whereby the usual condensed milk taste is completely eliminated.

This application is a continuation in part of my copending application with the Serial Number 186,310 which was filed September 22, 1950, and whereas in the copending application lactose was used in combination with hydrogen peroxide, in this application the hydrogen peroxide is dissipated by increasing the content of catalase and this is accomplished by adding powdered catalase enzyme to the milk.

In the past, various treatments and processes have been developed for the purpose of inhibiting spoilage of dairy products and to inhibit the tendency of many of these products to develop off flavors. Such treatments include, for example, various applications of refrigeration, heat sterilization, introduction of small amounts of special chemicals, use of low temperature vacuum evaporation when producing concentrates, and use of various types of sealed containers. While such treatments have greatly improved the quality of dairy products, a conventional canned or condensed milk has a peculiar or condensed milk flavor due to the presence of hydrogen peroxide.

With this thought in mind this invention contemplates adding to the natural catalase enzyme which is contained in natural milk in minute quantities an additional quantity of powdered catalase enzyme which dissipates hydrogen peroxide introduced into the milk, the hydrogen peroxide being decomposed into molecular oxygen and water whereby the usual cooked or condensed milk flavor is completely eliminated.

It is an object of the present invention to provide a process which is capable of producing whole sweet milk of improved quality and particularly characterized by having a natural milk flavor.

Another object of the invention is to provide a process for treating whole sweet milk to produce a canned product having inordinate keeping qualities as compared with those products produced by prior workers in this art.

2

A further object of this invention is to provide an improved canned whole sweet milk product in which the taste resulting from the introduction of hydrogen peroxide is completely eliminated.

Further objects of the invention will appear from the following description in which a preferred and critical embodiment has been set forth in detail.

It has been found, in accordance with the present invention, that the production of whole sweet milk sterilized and stabilized against subsequent deterioration may be accomplished only by carrying out certain procedural details which are highly critical in their nature and chronological sequence and which must be observed with meticulous detail to achieve optimum results.

As is conventional in milk processing generally, high quality whole sweet milk produced on farms under rigid sanitary regulations is gathered by milk haulers in refrigerated milk trucks or delivered by producers themselves to a central milk processing plant, where the milk is weighed, sampled, and graded for quality and flavor by experienced milk plant operators. After this preliminary processing, the whole sweet milk is ready for processing in accordance with the present invention.

The milk is first tested for butterfat content with a Babcock tester and standardized to 3.5%–4% B. F. content, depending upon local legal requirements.

It is preferred to use raw milk of Grade C quality or above, according to Public Health Service Milk Ordnance and Code. The higher the quality of the milk used from a bacteriological standpoint, the lower will be the amount of heat necessary in the sterilization process, to produce a sterile product, free of an objectionable cooked flavor.

The raw milk may be clarified or filtered at any temperature in ordinary practice in a milk processing plant, that being from approximately 40° F. to 140° F.

The butterfat content in the milk, skim milk or cream may be anywhere from .01% to 50% as determined by the Babcock method. The fat content of the milk product to be processed is immaterial to the proper operation of this process.

.1% to .2% by weight of an edible grade of 35% hydrogen peroxide (such as that known by the trade name of "Perone," manufactured by Dupont) is added to the milk at any temperature from 40° to 140° F. A temperature of 120° F. has proven best for this process in that repeated tests have shown that the bacterial killing efficiency of hydrogen peroxide in milk or milk products is best at this temperature. The hydrogen peroxide should remain in the milk while it is at a temperature of 40° to 140° F. for 15 to 45 minutes depending upon the bacterial quality of the original milk. Ordinarily a time of 30 minutes is sufficient for the hydrogen peroxide to remain in the milk.

After the hydrogen peroxide has been in the milk for 15 to 45 minutes, it is dissipated from the milk, being decomposed into molecular oxygen and water by adding .1 to .5 gm. per 1000 lbs. of milk of powdered catalase enzyme (known commercially as Powdered Catalase 30 manufactured by Armour and Company Laboratories). Catalase is an enzyme natural to milk in minute quantities; however, most natural milk as it comes from the cow does not contain enough catalase to decompose the added hydrogen peroxide into molecular oxygen and water even in the presence of added heat except after prolonged periods of contact.

Within five minutes or less after the powdered catalase enzyme has been added to the milk, delicate and exact qualitative tests for peroxides such as the test with p.phenylene diamine hydrochloride or potassium iodide show negative results thereby giving definite proof that the hydrogen peroxide has been completely dissipated or decomposed. Now, at this point, the milk does not contain any added foreign substance; that is any substance not normally present in the milk as it comes from the cow.

The milk or milk product should then be homogenized at a gauge pressure of 1500 lbs. to 3000 lbs. per square inch on a standard-type homogenizer or viscolizer such as that manufactured by the Creamery-Package Manufacturing Company or the Cherry-Burrel Corporation. The temperature of the milk during homogenization should be between 100° F. and 150° F. with approximately 140° F. being preferable.

After homogenization, the milk may or may not be cooled to a temperature of approximately 33° F. to 60° F. depending upon whether or not final canning and sterilization is to take place immediately.

After homogenization, either with or without subsequent cooling, the milk is placed in tin cans, sealed, and sterilized in a heated chamber at temperatures ranging from 212° F. to 250° F. where it is maintained for 5 to 60 minutes depending upon size of container, temperature of milk in the can, and temperature of sterilization. If a steam chamber is used, the above temperatures correspond to gauge pressures of 0 to 13.3 lbs. per square inch. Sterilization at a steam gauge pressure of 8 lbs. per square inch corresponding to a temperature of approximately 233° F. for milk of 45° F. temperature in a No. 2½ standard size tin can will produce a sterile milk free of an objectionable cooked flavor or order.

After sterilization, the milk should be immediately and quickly cooled to 50° F. or below to insure against continued heating and development of a cooked flavor. However, the temperature of the milk should not be allowed to go below 32° F.

Prior to consumption, the milk should be cooled to approximately 40° F. to 50° F. for best palatability.

Various details of the treatment as to temperatures, pressures, amounts of ingredients added, and the like, are to be considered as illustrative and not restrictive of the process.

"Milk" is to be understood to include mixtures in which cows' milk comprises an important or predominating ingredient.

In processes of preparing condensed or evaporated milk an edible, food grade hydrogen peroxide, free of undesirable metallic substances, is used as one of the bacterial killing agents. The hydrogen peroxide gives the product a peculiar flavor and the improvement of this process over similar processes is the method of adding the enzyme catalase to the milk which is a positive method of dissipating or decomposing the previously added hydrogen peroxide.

Dependence upon hydrogen peroxide decomposition is placed upon the natural amount of catalase contained in the milk, this amount (of catalase) normally present in milk is known to be a very variable factor. Variations in amount of catalase normally present in milk are caused by (1) the age of the cow from which the milk is obtained (2) the health of the cow (especially udder infections) and (3) the stage of lactation of cow. Therefore, it is quite conceivable that the natural amount of catalase in various milks will not be sufficient to decompose the added hydrogen peroxide in all instances, and in no case will the natural catalase rapidly decompose the hydrogen. In this process a positive quantity of catalase is added in sufficient amounts to decompose or dissipate the known added amount of hydrogen peroxide; consequently, dependence is not placed on the variable amount of catalase naturally present in milk. Heat alone, does not dissipate or decompose completely, the added hydrogen peroxide.

It is a well known fact by dairy bacteriologists, milk processors and public health officials that treatment of milk and milk products with hydrogen peroxide in the amounts used commercially does not kill all bacteria that may be in milk. Also, it is well known by authorities on the subject, that ordinary pasteurization processes, do not kill all bacteria. Since neither process alone kills all bacteria, it is reasonable to believe that both processes together do not kill all bacteria that may be present. In my experimental work, I have definite proof that bacteria do survive both the hydrogen peroxide treatment and ordinary pasteurization. Consequently, as the last step in my process, I have provided for a positive known method of sterilization. (That it, exposure to a heat above 212° F. for various periods of time, depending upon the bacterial quality of the original milk.)

Furthermore in commercial processes of pasteurization the milk is subject to bacterial contamination from the air, equipment, human handling, and final containers after it has been treated with hydrogen peroxide and subjected to a heat treatment. Consequently, an absolutely sterile product with unlimited keeping quality cannot be produced under these commercial conditions of manufacture. Whereas, in my process, heat sterilization above 212° F. as the final step in the process with the milk in its final container makes it possible to produce a sterile product, which may be stored at room temperature or above, so long as the final container is not opened.

Since the hydrogen peroxide treatment is specific in its destruction of the heat-resistant, spore forming, anaerobic bacteria found in milk, a much lower sterilization temperature and time exposure is necessary in my process, to produce a sterile product; consequently, the product produced under this process does not contain the objectionable cooked and scorched flavor common to evaporated milk which must be subjected to a higher heat for a longer time in order to effect sterilization.

It will be understood that modifications may be made in the design and arrangement of the process without departing from the spirit of the invention.

What is claimed is:

1. In a process for sterilizing and stabilizing whole sweet milk, the method of blending with the milk .1% to .2% by weight of an edible grade hydrogen peroxide, dissipating any residual hydrogen peroxide from the milk with .1 to .5 gm. of powdered catalase enzyme per 1000 pounds of the milk, homogenizing the milk at high pressure and stabilizing the milk by heat.

2. A process for sterilizing and stabilizing whole sweet milk which comprises pasteurizing the milk and then blending with the pasteurized milk an additive consisting of an edible grade of 35% hydrogen peroxide, dissipating said hydrogen peroxide from the milk with powdered catalase enzyme, and homogenizing the milk by subjecting the final product to heat and pressure.

3. A process for sterilizing and stabilizing whole sweet milk which comprises heating the milk to 100°–110° F., filtering and clarifying the heated milk, pasteurizing the milk, reheating the milk to 80° F., blending with the milk at this temperature an additive consisting of .1% to .2% by weight of an edible grade of 35% hydrogen peroxide and after a period of time dissipating said hydrogen peroxide from the milk with .1 to 5 gm. per 1000 pounds of milk of powdered catalase enzyme, said hydrogen peroxide being decomposed into molecular oxygen, heating the milk-additive mixture to 142°–144° F. and maintaining it at said temperature for 30–35 minutes while subjecting the mixture to gentle agitation, subjecting the thus treated milk to homogenization, rapidly cooling the milk, and canning and sterilizing the milk.

4. The method of processing and canning whole sweet milk which comprises clarifying and filtering raw milk at a temperature from 40° F. to 140° F., adding .1% to .2% by weight of an edible grade of 35% hydrogen peroxide to the milk at a temperature between 40° F. and 140° F., after a period of from 15 to 45 minutes dissipating the hydrogen peroxide from the milk by adding .5 to 5 gm. per 1000 pounds of milk of powdered catalase enzyme, homogenizing the milk at a temperature between 100° and 150° F., placing and sealing the milk in tin cans, sterilizing the milk in said cans at a temperature ranging from 212° F. to 250° F. and cooling the milk in the cans to a temperature of approximately 50° F. and not below 32° F.

5. The process of preparing whole sweet milk for canning which comprises destroying bacteria in the milk by blending with the milk an edible grade of hydrogen peroxide, dissipating the hydrogen peroxide from the milk by adding catalase enzyme to the milk and homogenizing the milk by subjecting the final product to a gauge pressure of from 1500 to 3000 pounds per square inch and sterilizing the product.

6. The process of preparing whole sweet milk for canning which comprises clarifying and pasteurizing the milk, mixing with the milk an edible grade of hydrogen peroxide, holding the milk for a period of from 15 to 45 minutes, dissipating the hydrogen peroxide from the milk with catalase enzyme and homogenizing the resulting product by subjecting the product to high pressure in the presence of heat.

7. In a process of treating whole sweet milk, the method of blending with the milk an edible grade of hydrogen peroxide, dissipating any residual hydrogen peroxide from the milk with catalase enzyme, and sterilizing the treated milk by heat.

8. In a process of treating whole sweet milk, the method of blending an edible grade of hydrogen peroxide with the milk, dissipating any residual hydrogen peroxide from the milk with a powdered catalase enzyme, and homogenizing the product at high pressure.

9. In a process of sterilizing and stabilizing whole sweet milk the method of blending with said milk an edible grade of 35% hydrogen peroxide, dissipating any residual hydrogen peroxide from the milk with powdered catalase enzyme, homogenizing the milk at high pressure and sterilizing the milk by heat.

LLOYD T. WINGER.

REFERENCES CITED

The following references are of record in the file of this patent:

UNITED STATES PATENTS

| Number | Name | Date |
|---|---|---|
| 1,039,849 | Trudel | Oct. 1, 1912 |
| 1,140,717 | Rutter | May 25, 1915 |
| 1,587,485 | Lowy | June 1, 1926 |
| 2,053,740 | Reichert et al. | Sept. 8, 1936 |
| 2,125,398 | Reichert et al. | Aug. 2, 1938 |
| 2,482,724 | Baker | Sept. 20, 1949 |

FOREIGN PATENTS

| Number | Country | Date |
|---|---|---|
| 9,703 | Great Britain | of 1905 |
| 24,155/35 | Australia | Aug. 27, 1936 |

OTHER REFERENCES

"Milk" textbook by P. G. Heineman, published by W. B. Saunders Co., 1919, pages 223 and 225.